DRY CHEMICAL FEEDER METHOD AND APPARATUS

Original Filed Nov. 13, 1967

INVENTOR.
Preston G. Gaddis
BY
William S. Dorman
ATTORNEY

United States Patent Office

Re. 27,681
Reissued June 19, 1973

27,681
DRY CHEMICAL FEEDER METHOD AND APPARATUS

Preston G. Gaddis, 203 S. Osage,
Bartlesville, Okla. 74003

Original No. 3,425,669, dated Feb. 4, 1969, Ser. No. 682,410, Nov. 13, 1967. Application for reissue Sept. 24, 1970, Ser. No. 75,307
Int. Cl. B01f *5/00*
U.S. Cl. 259—18 22 Claims

Matter enclosed in heavy brackets [ ] appears in the original patent but forms no part of this reissue specification; matter printed in italics indicates the additions made by reissue.

ABSTRACT OF THE DISCLOSURE

A method and means for feeding and mixing a dry chemical of the free flowing type, such as agglomerative polymers with a liquid, to provide a smooth, clear solution which can be proportioned and added directly into a primary or secondary system with accuracy. The chemical is separated into small individual particles which are dropped into a gentle wetting plane whereby each particle is completely wetted. The wetted particle enters the mixing solution and is quickly dissolved into a smooth, clear mixture.

This invention relates to improvements in a method and means for feeding and mixing a dry chemical with a liquid, and more particularly, but not by way of limitation, to a method and means for feeding and mixing dry chemicals of the free flowing type, such as agglomerative polymers, with a liquid solution.

Many new free flowing chemicals have been developed and are being developed such as polymers, phosphates, powdered detergents, coagulants, and the like, that are soluble in water or salt brine. These result solutions have been found to be of great value in many uses, such as in the treating of polluted water, such as streams and rivers, and the like. For example, properly proportioned quantities of the chemical solutions, when added to flowing water, or other polluted water, quickly and efficiently causes the polluting material to either precipitate out of the moving stream, or in other instances to rise to the surface of the water whereupon the accumulated foreign matter may be removed from the water.

Whereas these new chemicals have proven to be very effective for a variety of uses, they have the characteristic of polymerizing and the problem of feeding and mixing the chemicals such as that chemical known as polyacrylicamine, is great in that the wetting thereof is very difficult. The chemicals tend to "ball" together and form relatively large globules or masses, and only the outer periphery of each mass is wetted, and the interior thereof is completely dry. It is substantially impossible to break up the collected masses, and the only manner to date in which the entire mass may be wetted is by dissolving thereof. Of course, this is a relatively slow process, and is a great disadvantage.

The present invention contemplates a novel method and means for efficiently feeding and mixing these new polymers, such as [polyacrylicamine], *polyacrylamides* with a liquid in such a manner that the chemicals are mixed quickly and thoroughly to provide a fresh, smooth, clear solution which may be readily added to the water, or the like, being treated by the solution. The novel method comprises separating of the chemical into individual particles, and gently feeding or dispensing the individual or separate particles onto a wetting plane. Thus, each particle is quickly and completely wetted for precluding a massing or agglomeration of the individual particles. The wetting particles are rolled or moved along the wetting plane and dropped into the mixing chamber for being taken into solution. The liquid solution contained in the mixing chamber is agitated in a rolling or rotating manner and the rotating solution picks up the deposited wetted particles and swirls the particle within the solution for a quick and efficient mixing thereof.

The apparatus disclosed herein for performing the feeding and mixing method is generally similar to that disclosed in my co-pending application Ser. No. 464,450, filed June 16, 1965, and entitled "Apparatus and Method for Mixing and Dispensing a Dry, Particulate Solid with a Liquid." However, the dry chemicals to be added to the solution in the present invention are deposited from a storage hopper, or the like, onto a vibrating feeder mechanism wherein the dry chemicals are bounced or jostled along a feeder tray in a relatively gentle manner for separating the chemical into individual particles. As the individual particles drop from the feeder tray, they impinge upon a downwardly slanted wetting plane, which may be either a relatively solid sheet of water, or other liquid, as desired, emitting from a spray nozzle, or may be an angularly disposed plate member having a flow of water, or other liquid, moving over the upper surface thereof, or any other similar wetting area. Each individual particle of the dry chemical is substantially instantaneously and thoroughly wetted by the wetting plane since each particle is relatively small. The wetted particles move downwardly along the wetting plane until the relatively solid liquid area becomes a series of streamlets, whereupon the wetting particles drop downwardly with the streamlets into the the mixing area. The liquid solution with which the chemicals are to be mixed are introduced into the mixing area in such a manner that the solution rolls and rotates within the mixing container and picks up the deposited chemical particles for rolling and rotating the particles along with the solution. This assures an efficient and thorough mixing of the solution. Of course, float means, or the like, is provided for controlling the quality of solution being mixed, and when a sufficient quantity has been mixed, the entire operation is automatically ceased until such time that the quantity of solution has been depleted sufficiently for requiring the mixing of additional quantities. The mixture is pumped or otherwise delivered from the mixing chamber for proportioned additioned to the water, or other liquid being treated thereby.

It is an important object of this invention to provide a novel method and means of quickly and efficiently feeding and mixing a free flowing agglomerative dry chemical with a liquid solution.

Another object of this invention is to provide a novel method and means of feeding and mixing a dry chemical with a liquid solution in a manner wherein a thorough wetting of the dry chemical is readily accomplished.

It is another object of this invention to provide a novel method and means of feeding and mixing a free flowing agglomerative dry chemical with a liquid solution in a manner substantially precluding massing of individual particles during the wetting process.

A further object of this invention is to provide a novel method and means for feeding and mixing a free flowing agglomerative dry chemical with a liquid solution in a manner provide a smooth, clear solution in a minimum of time in order to maintain a freshness for the solution for facilitating the treating results thereof.

A still further object of this invention is to provide a novel method and means for feeding and mixing a free flowing agglomerative dry chemical with a liquid solution which is simple and efficient in operation and economical and durable in construction.

Other and further objects and advantageous features of the persent invention will hereinafter more fully appear in connection with a detailed description of the drawings in which.

Figure 1:
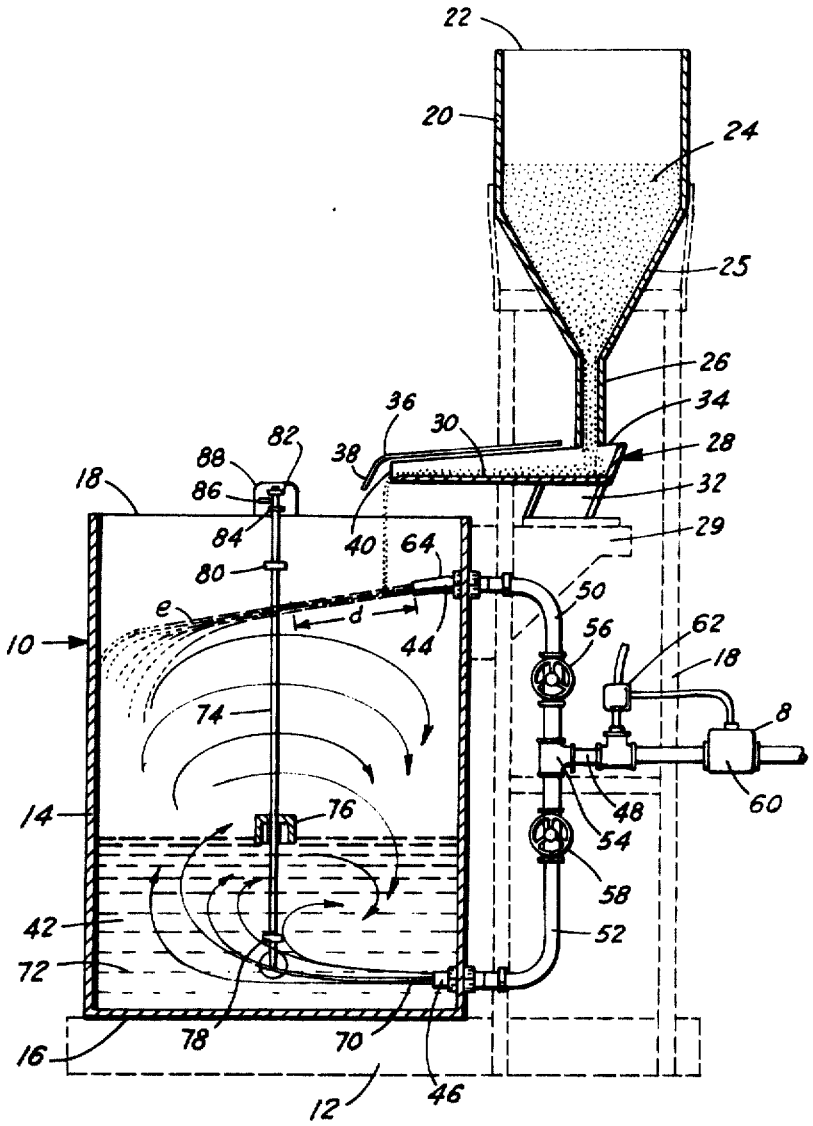
FIGURE 1 is a sectional elevational diagrammatic view of a chemical feeding and mixing apparatus embodying the invention, with portions depicted in dotted lines for purposes of illustration.

Referring to the drawings in detail, reference character 10 generally indicates a feeding and mixing apparatus comprising a base frame or platform 12 for supporting a mixing container or vessel 14 into which is introduced a liquid and a chemical which are to be mixed therein. The vessel 14 may be of any suitable type, and as depicted herein is preferably substantially cylindrical with a closed bottom 16 and a open top 18.

An upright or vertically disposed support structure or frame 18 is secured to the base 10 and is spaced slightly to one side of the vessel [12] *14* for supporting a hopper 20, or the like. The hopper 20 is provided with an open upper end 22 whereby a quantity of dry chemicals 24 may be deposited within the hopper 20 for storage and delivery to the vessel 14 as will be hereinafter set forth. Of course, a suitable removable cover (not shown) may be provided for the open end 22, if desired. The hopper 20 may be of any suitable type, and as shown in FIGURE 1 is provided with a conical or downwardly and inwardly tapered portion 25 which terminates in a centrally disposed open funnel-type member 26 at the lower end thereof. The funnel 26 is disposed directly above and spaced slightly from a feeder member, generally indicated at 28, for discharging a supply of the chemical 24 thereon.

The feeder 28 is suitably mounted on or carried by a support bracket [20] *29* which may be secured to the outer periphery of the vessel 14 in any well known manner, or may be secured to the upright frame [18] *16*, as desired. The feeder 28 is a vibratory feeder and may be any well known feeder of this type. However, it is preferable that the feeder 28 be that known as the Syntron Model F–TOC vibratory feeder manufactured by the Syntron Company, and as set forth in detail in the Syntron Company brochure No. P.O. No. 5567 IM, printed in U.S.A. in January 1967. The feeder 28 comprises a trough 30 mounted on a base assembly 32 which includes an electromagnet (not shown), a spring system (not shown) and isolators (not shown). Electric power is supplied to the electro-magnet by means of a separate controller (not shown) which consists of a rheostat, rectifier and switch. The rectifier converts alternating current to (half wave) pulsating current and the rheostat provides a means of varying the current input to the electro-magnet coil which in turn varies the feed rate of material on the trough.

The upper edge 34 of the trough 30 is open for receiving the chemical 24 from the hopper 20, and it is preferable to provide a guard member 36 for the forward portion of the open edge 34. The guard or protector 36 may be secured to the trough 30 in any well known manner (not shown) and is preferably provided with an angularly disposed downwardly extending flange portion 38 spaced slightly from the open forward end 40 of the trough 30. Thus, as the chemical 24 is jostled or bounced along the trough 30 for separation into individual particles and the particles are discharged from the open end 40, the guard 36 protects the separated particles from accidental dispersement by wind or air drafts.

A supply of liquid 42 such as water, or the liket, is delivered to the vessel 14 through an upper spray nozzle 44 and a lower spray nozzle 46 in a manner as will be hereinafter set forth. The nozzles 44 and 46 are mounted in the side wall of the vessel 14 in any well known manner whereby the water or liquid discharged from each nozzle is directed into the interior of the vessel. Each nozzle 44 and 46 is in communication with a liquid supply source (not shown) through a main conduit 48 having pair of branch conduits 50 and 52 connected therewith by a suitable T 54, or the like, whereby a portion of the liquid will be delivered to the nozzle [14] *44* and the remaining portion of the liquid will be delivered to the nozzle 46. A pair of substantially identical valves 56 and 58 are interposed in the branch lines 50 and 52, respectively, whereby the supply of liquid to the nozzles 44 and 46 may be regulated or controlled. A solenoid valve 60 is interposed in the main line 48 and is operable by the electrical circuit in a manner as will be hereinafter set forth and in the manner disclosed in my aforementioned co-pending application for controlling the flow of liquid through the line 48. In addition, a flow-switch 62 is connected with the main line 48 whereby the liquid stream passes through the flow-switch 62 in a velocity suitable to close the [valve] *switch* 62 for closing the electrical circuit. The flow-switch 62 is operably connected with the water system in the manner as set forth in my aforesaid pending application Ser. No. 464,450. The flow-switch 62 remains open as long as no liquid is moving therethrough and thus precludes opening of the hopper funnel 26 for the discharge of chemical into the feeder 28. As soon as the liquid stream moves through the flow-switch 62, the switch 62 is closed or activated for energizing the electrical circuit for permitting a release of chemicals into the feeder 28, as will be hereinafter more fully set forth, and the switch 62 then returns to the normal open position thereof to be readily for the next cycle.

Figure 2:
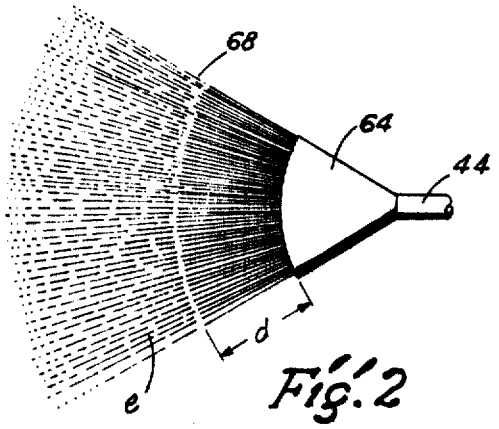
FIGURE 2 is a plan view of a spray nozzle and wetting plane as utilized in the invention.

The nozzle 44 is of a particular design wherein the outlet or discharge portion 64 thereof is flared or fan-shaped as particularly shown in FIGURE 2 and is relatively thin in cross section whereby the spray or jet of water 68 discharged therefrom is directed in a substantially fan-shaped configuration. In addition, the fan-portion 64 extends angularly downward as shown in FIGURE 1 whereby the stream of water 68 is directed downwardly at an angle within the vessel 14. It is preferable that the plane of the fan portion 64 be disposed at a downward angle of approximately twenty two degrees with respect to the horizontal, but not limited thereto. The fan-shaped portion 64 also ejects the liquid or water stream 68 therefrom in such a manner that the first portion of the stream 68 emitting therefrom forms a substantially solid plane of water through a distance as indicated by d. This distance d is sufficiently great to extend beyond the limit of the discharge end 40 of the feeder *trough 30* [tray 34], thus assuring that the chemical 24 dropping from the [tray 34] *trough 30* falls onto the water plane established throughout the distance d. The outer reaches of the water stream 68 form into individual streamlets, as indicated at e and fall downwardly by gravity into the interior of the vessel 14, carrying the initially wetted chemical particles therewith.

The nozzle 46 may be of a type similar to the nozzle 44, or of any other suitable type, and injects the lower incoming water or liquid stream 70 into the vessel 14 with great velocity whereby the stream 70 circulates upwardly and around within the vessel 14 as indicated by the arrows in FIGURE 1. The turbulence of the incoming water stream 70 facilitates the mixing of the chemicals with the accumulation of liquid 72 within the vessel as will be hereinafter set forth.

The level or quantity of the liquid solution 72 accumulated within the vessel 14 may be controlled by a suitable level control or float device, as is well known. As particularly shown herein, the level control or sensing means may comprise a longitudinally extending guide rod 74 secured within the vessel 14 in any suitable manner (not shown) whereby some longitudinal movement thereof is permitted. The rod 74 is preferably spaced from the sidewalls of the vessel 14 and supports and guides a suitable float member 76 which is reciprocally disposed thereon. A lowermost flange or stop member 78 is rigidly secured to the rod 74 and spaced slightly upwardly from the lower end thereof, as shown in FIG. 1. A second stop member 80 is similarly rigidly secured to the rod 74 and spaced upwardly from the stop 78, and the float 76 is interposed between the stop members 80 and 78. A pair of complementary stop members 82 and 84 are provided at the top end of the rod 74, and are spaced apart from spanning a suitable switch 86 which is secured to an upwardly extending bracket 88 provided on the open end 18 of the vessel 14. The switch 86 is operably connected in the control system for opening and closing of the solenoid 60 as will be hereinafter set forth.

The float 76 rides substantially on the surface or at the surface of the liquid solution 72 and fluctuates within the vessel 14 simultaneously therewith. When the level of the solution 72 drops sufficiently low within the vessel 14, the float 76 engages the lower stop member 73 and upon continued lowering of the liquid level the float 76 moves the stop 78 downwardly, carrying the rod 74 therewith. As the rod 74 moves downwardly, the uppermost flange or stop 82 is moved into engagement with the switch 86. This actuates the switch 86 for opening the solenoid valve 60 for admitting liquid through the line 48 and [valve 62] *switch 62* for closing the circuit thereby operating the feeder and admitting liquid into the interior of the vessel 14 through the nozzles 44 and 46. Alternately, when the level of the solution 72 within the vessel 14 rises a sufficient distance, the float 76 is brought into engagement with the stop member 80, and continued rising of the level of the solution causes the stop 80 to rise within the vessel, carrying the rod 74 upwardly until the stop member 84 is brought into engagement with the switch 80. This activates the switch 86 for closing the solenoid valve 60 in order to interrupt the flow of liquid through the nozzles 44 and 46 and stop the feeding of the chemicals. Of course any suitable means may be provided for controlling the level or quantity of solution 72 to be accumulated within the vessel 14, and is not limited to the means shown herein. Furthermore, the stop members 78 and 80 may be adjustably secured to the rod 74, if desired, in order to vary the limiting action of the level control device.

A suitable drain opening or port (not shown) is provided in the proximity of the lower portion of the vessel 14, and a suitable proportioning pump, or the like (not shown) may be connected therewith, in the manner set forth in my aforementioned co-pending application Ser. No. 464,450, in order to deliver the liquid solution 72 from the vessel 14 to the treatment area of primary liquid system to be treated by the chemical solution. Furthermore, as hereinbefore set forth, the electrical control system for the apparatus 10 is substantially identical with that disclosed in my co-pending application Ser. No. 464,-450, and the operation of the apparatus 10 is as follows:

When the vessel 14 is empty, or nearly so, the float 76 will be disposed in the lower portion thereof for positioning the stop member 82 against the switch 86. This activates the electrical system (not shown) for opening the solenoid 60 for supplying water or liquid to the nozzles 44 and 46. The hopper funnel 26 [is also opened] *is open* for discharging a quantity of the chemicals 24 onto the feeder tray 34. As hereinbefore set forth, the flow-switch 62 is so arranged as to preclude opening of the hopper funnel prior to the flow of liquid through the flow-switch, thus precluding any accidental delivery of the chemicals 24 to the vessel 14 prior to the entry of the flow streams 68 and 70 therein. In addition, a slight time delay is provided between the opening of the valve [56] *60* and the hopper funnel 26 in order to assure that the water or wetting plane will be established within the vessel and below the discharge end of the [feeder tray 34] *trough 30* prior to the discharge of any chemical particles into the vessel. Of course, the operation of the feeder [32] *28* is also initiated at the beginning of the operational sequence.

The liquid or water entering the vessel 14 through the nozzle 46 swirls and rolls within the vessel as shown by the arrows in FIGURE 1, and the water stream 68 from the nozzle 44 forms the wetting plane and ultimate streamlets which drop downwardly into the rolling solution 72.

As the chemicals 24 are discharged into the *trough 30* [tray 34], the vibration of the tray gently bounces the chemicals along the tray and separates the chemical into individual particles. Of course, the rate of vibration of the [tray 34] *trough 30* may be adjusted, as is well known, and as is provided for in the feeder described herein. The individual particles of the chemical drop gently off the discharge end 40 of the [tray 34] *trough 30* and fall onto the wetting plane emitting from the nozzle 44. Of course, as hereinbefore set forth, the wetting plane may comprise a plate (not shown) having a film or stream of water or liquid moving therealong, or may be an atomized area, a mist, a stream, or the like, and is not limited to the particular embodiment disclosed herein.

The individual particles of chemical, being relatively small, are substantially immediately wetted upon contact with the wetting plane, and the wetted particles move along the flow stream 68 to mingle with the streamlets indicated at e. The streamlets and wetted particles drop downwardly by gravity into the vessel, and are picked up by the rolling, swirling solution 72, and as a consequence are quickly and efficiently taken into solution.

The feeding and mixing operation continues until the quantity of solution 72 contained within the vessel is sufficient for elevating the float member 76 through a sufficient distance for moving the stop member 84 into engagement with the switch 86. This interrupts the operation of the apparatus, thereby stopping the flow of liquid through the valves 56 and 58 and thus stopping the discharge of liquid from the nozzles 44 and 46, as well as stopping the discharge of chemicals onto the *trough 30* [tray 34]. In this sequence of operation, the hopper funnel 26 is closed prior to the closing of the valves 56 and 58, and the time delay is sufficient for assuring that all of the chemicals contained in the [tray 34] *trough 30* are discharged into the vessel and mixed in the solution 72 prior to stopping of the supply of liquid to the vessel.

The proportioning pump (not shown), or the like, may then be utilized in a manner similar to the operation set forth in my said co-pending application for adding the desired quantity of the solution 72 to the water, or the like, of the primary system to be treated. Of course, it is also posible to add the solution 72 to the water to be treated during the mixing operation, if desired. Thus, either a batching type operation, or a continuous operation of treating for the primary system may be provided.

From the foregoing it will be apparent that the present invention provides a novel chemical feeding and mixing apparatus and method for quickly and efficiently wetting and mixing of chemicals which have the characteristic of polymerizing or agglomerative chemicals which are normally difficult to wet. The novel method and means comprises gently dropping of individual chemical particles onto a wetting plane. The relatively small size of the particles permits a rapid wetting of the chemical. The wetted chemicals are discharged into a rolling, swirling liquid and are quickly and efficiently mixed therewith. The quantity of the accumulated liquid solution in the mixing vessel is regulated and the liquid solution may be discharged from the mixing vessel for batch type addition to the primary system to be treated, or may be discharged continuously during a mixing operation, as desired. In addition, the entire operation of the system is automatically controlled in a manner for providing an efficient and simple chemical feeding and mixing operation.

What is claimed is:

1. An apparatus for dispensing and mixing a dry chemical with a liquid and comprising a mixing chamber, a chemical storage reservoir, feeder means interposed between the chemical storage reservoir and mixing chamber, a wetting plane provided in the mixing chamber, said feeder means adapted for separating the chemical into individual particles and dispensing the individual particles onto the wetting plane, means for introducing a liquid into the mixing chamber in a rolling swirling action, and said wetting plane discharging the wetted individual particles therefrom into the swirling liquid for a thorough mixing of the chemicals therewith to provide a liquid solution.

2. An apparatus for dispensing and mixing a dry chemical with a liquid as set forth in claim 1 wherein level control means is provided for the solution in the mixing chamber.

3. An apparatus for dispensing and mixing a dry chemical with a liquid as set forth in claim 1 wherein said feeder means comprises a vibrating tray member for receiving the chemical thereon whereby the chemical is separated into said individual particles and gently discharged therefrom onto the said wetting plane.

4. An apparatus for dispensing and mixing a dry chemical with a liquid as set forth in claim 1 wherein means is provided for precluding discharge of the dry chemicals prior to the introduction of the liquid into the mixing chamber.

5. An apparatus for dispensing and mixing a dry chemical with a liquid as set forth in claim 1 wherein the wetting plane comprises a stream of liquid passing beneath the discharge end of the feeder means, said liquid stream including a substantially solid area of liquid immediately under the said discharge end of the feeder means for initially receiving the individual chemical particles therefrom and terminating in liquid streamlets falling downwardly into the swirling solution in the mixing chamber for carrying the initially wetted chemical particles into the liquid.

6. An apparatus for dispensing and mixing a dry chemical with a liquid and comprising a mixing vessel having an open upper end, a chemical storage hopper disposed above the open end of the mixing vessel, a feeder device interposed between the hopper and the open end of the vessel for receiving the chemical from the hopper and delivering the chemical to the vessel, said feeder device adapted to separate the chemical into individual particles and discharge the individual particles into the vessel through the open end thereof, a wetting plane provided within the vessel and spaced below the open end thereof for receiving the individual chemicals from the discharge end of the feeder device, said wetting plane being disposed at a downward angle with respect to the horizontal for directing the initially wetted chemical particles downwardly into the vessel, means extending through the sidewall of the vessel for directing the liquid into the interior thereof in a swirling motion within the vessel, said water plane adapted for discharging the wetted chemical particles into the swirling liquid for a thorough mixing of the chemical with the liquid.

7. An apparatus for dispensing and mixing a dry chemical with a liquid as set forth in claim 6 wherein level control means is provided in the vessel for control of the quantity of liquid and chemical mixture accumulated therein.

8. An apparatus for dispensing and mixing a dry chemical with a liquid as set forth in claim 6 wherein means is provided for precluding discharge of the dry chemicals prior to the introduction of the liquid into the vessel.

9. An apparatus for dispensing and mixing a dry chemical with a liquid as set forth in claim 6 wherein the wetting plane is introduced into the vessel by nozzle means wherein the initial portion of the wetting plane is substantially solid liquid for receiving the chemical particles, and the latter portion of the wetting plane comprises streamlets dropping downwardly within the vessel for carrying the wetted chemical particles into the swirling liquid therein.

10. A method for feeding and mixing a dry chemical with a liquid which comprises introducing the liquid into a mixing chamber, providing a swirling action for the liquid in the chamber during the mixing operation, providing a wetting plane within the mixing chamber above the swirling liquid, providing a supply of the chemical independent of the mixing chamber, separating the chemical into individual particles, dropping the individual particles by gravity onto the wetting plane for an initial wetting of the particles and moving the initially wetted particles along the wetting plane for discharge into the swirling liquid for a thorough mixing of the chemicals with the liquid.

11. A method of feeding and mixing a dry chemical with a liquid as set forth in claim 10 wherein a controlled sequence of operation precludes introduction of unwetted chemical into the mixing chamber without the predetermined quantity of liquid being in the chamber.

12. A method of feeding and mixing a dry chemical with a liquid as set forth in claim 10 which includes controlling of the level of the liquid within the mixing chamber.

13. A method of feeding and mixing a dry chemical with a liquid as set forth in claim 10 wherein the step of separating the chemical into individual particles comprises discharging a quantity of the chemical into a feeder mechanism, moving the chemical through the feeder mechanism in a gentle bouncing action for separation thereof into the said individual particles, and discharging the individual particles gently from the feeder mechanism onto the wetting plane for the initial wetting of the particles.

14. A method of feeding and mixing a dry chemical with a liquid as set forth in claim 13 which includes the step of precluding discharge of the unwetted chemical from the feeder without a predetermined quantity of the liquid being in the mixing chamber.

*15. In an apparatus for mixing a particulate material with a liquid, the improvement which comprises:*

*means for dispensing the liquid to form a wetting plane; and*

*means for dispensing the particulate material as a thin, relatively wide curtain-like layer of discrete particles of the particulate material onto the liquid which forms the wetting plane to wet each particle individually before that particle contacts another particle in the presence of the liquid to prevent the particles from adhering to each other.*

*16. The apparatus of claim 15, wherein the means for dispensing the liquid to form a wetting plane includes a relatively narrow opening for discharging the liquid as a sheet.*

*17. The apparatus of claim 16, wherein the means for discharging the particulate material comprises:*

*a trough having a first end which is adapted to receive and contain a quantity of the particulate material and the second end of which is open and positioned over the wetting plane; and*

*means for vibrating the trough to cause the particulate material to form a layer in the trough and be discharged from the second end thereof as a thin, relatively wide curtain-like layer of discrete particles which fall onto the wetting plane.*

*18. The apparatus of claim 17 including a particulate material storage reservoir the bottom of which communicates with and feeds by gravity into the first end of said trough.*

*19. The apparatus of claim 15 wherein the means for discharging the particulate material comprises:*

*a trough having a first end which is adapted to receive and contain a qantity of the particulate material and a second end which is open and positioned over the wetting plane; and*

*means for vibrating the trough to cause the particulate material to form a layer in the trough and be discharged from the second end thereof as a thin, relatively wide curtain-like layer of discrete particles which fall onto the wetting plane.*

*20. A method of mixing a particulate material with a liquid which comprises the steps of:*

*dispensing the liquid to form a wetting plane; and*

*discharging discrete particles of the particulate material as a thin, relatively wide curtain-like layer onto the liquid which forms the wetting plane to wet each particle individually before that particle contacts another particle in the presence of the liquid to prevent the particles from adhering to each other.*

*21. The method of claim 20 wherein the liquid is dispensed to form a sheet of liquid the width of which is substantial relative to its thickness.*

*22. The method of claim 21 wherein the particulate material is discharged by the steps of:*

*introducing the particulate material into a trough proximate one end thereof; and*

*vibrating the trough to cause the particulate material to travel to the other end of said trough and be discharged therefrom as a thin, relatively wide curtain-like layer of discrete particles which fall onto the wetting plane.*

References Cited

The following references, cited by the Examiner, are of record in the patented file of this patent or the original patent.

UNITED STATES PATENTS

| | | | |
|---|---|---|---|
| 2,161,342 | 6/1939 | Francis | 222—199 |
| 2,980,290 | 4/1961 | Fahrni | 222—199 X |
| 3,147,955 | 9/1964 | Harvey | 259—4 |
| 3,164,443 | 1/1965 | Watson | 259—4 |
| 2,906,607 | 9/1959 | Jamison | 259—4 X |
| 3,088,713 | 5/1963 | Gard | 259—18 |
| 3,212,757 | 10/1965 | Martin | 259—4 |
| 3,338,560 | 8/1967 | Katzer | 259—4 |

ROBERT W. JENKINS, Primary Examiner

U.S. Cl. X.R.

259—95